United States Patent [19]

Amarakoon

[11] Patent Number: 4,805,067
[45] Date of Patent: Feb. 14, 1989

[54] REMOVAL OF STATIC FROM THE PLATEN OF A COPYING APPARATUS

[75] Inventor: Kiri B. Amarakoon, Letchworth, England

[73] Assignee: Xerox Corporation, Stamford, Conn.

[21] Appl. No.: 445,788

[22] Filed: Dec. 1, 1982

[30] Foreign Application Priority Data

Dec. 16, 1981 [GB] United Kingdom ............... 8137882

[51] Int. Cl.⁴ .............................................. H05F 3/00
[52] U.S. Cl. ..................................... 361/212; 361/214
[58] Field of Search ....................... 361/212, 220, 214; 271/275, 208

[56] References Cited

U.S. PATENT DOCUMENTS

| | | | |
|---|---|---|---|
| 2,346,483 | 4/1944 | Goss | 361/220 |
| 3,094,436 | 6/1963 | Schröder | 361/212 X |
| 4,040,120 | 8/1977 | Geadah et al. | 361/220 |
| 4,163,139 | 7/1979 | Malarkey et al. | 361/212 X |
| 4,252,841 | 2/1981 | Kinugawa et al. | 427/108 |
| 4,298,279 | 11/1981 | Yoshimura et al. | 361/214 X |
| 4,474,457 | 10/1984 | Phelps | 361/214 X |

FOREIGN PATENT DOCUMENTS

| | | | |
|---|---|---|---|
| 0062466 | 5/1980 | Japan | 361/212 |
| 65637 | 5/1980 | Japan | 361/214 |

OTHER PUBLICATIONS

"Prevention of Static Discharge in Display Tubes", H. L. Rowe, IBM Technical Disclosure Bulletin, vol. 20, No. 12, May 1978.

Xerox Disclosure Journal, "Platen Transport Belt Static Eliminator", Victor Castro-Hahn, vol. 5, No. 4, Jul./Aug. 1980.

Xerox Disclosure Journal, "Platen Glass Static Eliminator", Victor Castro-Hahn, vol. 6, No. 6, Nov./Dec. 1981.

Primary Examiner—J. R. Scott

[57] ABSTRACT

A copying apparatus including a transparent glass platen (10) across which documents for copying are moved. On its face remote from that across which documents are moved, the platen carries a layer (11) of a material which has a lower surface resistivity than the glass, and is typically less than $10^9$ ohms per square. The conductive layer is electrically connected, for example to ground, so as to remove electrostatic charge from the platen.

1 Claim, 1 Drawing Sheet

REMOVAL OF STATIC FROM THE PLATEN OF A COPYING APPARATUS

BACKGROUND OF THE INVENTION

This invention relates to a copying apparatus of the kind including a transparent glass platen across which documents for copying are moved, and means for removing electrostatic charges from the platen.

Typical of such copying apparatuses are xerographic copying machines, especially those including an automatic or semi-automatic document handler. In such machines, documents to be copied are moved across the platen by a suitable drive mechanism. In one arrangement, each document is moved from a start position into a stationary exposure position on the platen. After exposure, the document is moved off the platen. In another arrangement, each document is moved continuously across the platen during exposure. In a recirculating document handler, documents are fed successively from a stack of documents, across the platen, and back into the stack. Typical of driving mechanisms for the documents is a friction belt, usually a broad, endless belt of plastics material, which drags the documents across the platen. An example of a document handler of this type is described in U.S. Pat. No. 3,556,512.

The glass from which the platen is usually made is standard soda lime float glass, because it is relatively inexpensive, has good light transmission, and can be made sufficiently optically flat to enable good reproduction of the documents to be copied. It has been found that with certain kinds of document handler, especially high speed ones, a build up of static electrical charge takes place on the platen due to frictional contact between the document and the platen, between the document and drive belt, and between the belt and the platen in those parts of the copying cycle where there is no document between the platen and the belt.

This build up of electrostatic charges gives rise to the problem that there is an increasing tendency for documents to adhere to the platen which may eventually cause a document jam, and an interruption of the copying cycle.

A device for preventing the build up of electrostatic charge on the platen of a copying machine is described in Japanese patent application No. 55-164838. This device includes a conductive brush-like member which is arranged to sweep the underside of the platen so as to remove any build up of charge. The brush-like member is driven by the scanning optics mechanism of the copying machine. In a copying machine not using scanning optics, specific provision would need to be made for driving the brush-like member.

It is an object of the present invention to provide a copying apparatus in which the problem of electrostatic charge build up on the platen is overcome without the need for any additional mechanisms.

SUMMARY OF THE INVENTION

According to the invention, there is provided a copying apparatus including a transparent glass platen across which documents for copying are moved, wherein the platen carries, on its face remote from that across which documents are moved, a layer of a material of lower surface resistivity than the glass, said conductive layer being electrically connected so as to remove electrostatic charge from the platen.

The foregoing and other objects, features and advantages of the invention will be apparent from the following more particular description of the preferred embodiments of the invention as illustrated in the accompanying drawings.

DESCRIPTION OF THE PREFERRED EMBODIMENTS

Figure 1:
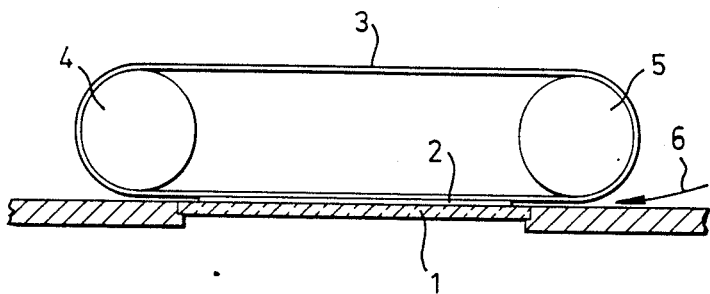
FIG. 1 is a simplified diagrammatic cross section of a platen and a document feeding device for feeding documents over the platen.

Referring to FIG. 1, a platen 1 supports a document 2 for copying. The document is illuminated from below the platen, and an image of the document is projected onto a suitable photosensitive surface (not shown). In a typical document handling device for a copying machine, the document is fed across the platen 1 for copying, and then off the platen, by means of a feed belt 3. Feed belt 3 is a broad, endless belt which is shown for purposes of illustration as being arranged for circulating movement around rollers 4, 5. The document 2 is fed into the nip between the belt 3 and platen 1, as indicated by arrow 6, and is dragged by virtue of the frictional forces arising between the belt and document, over the platen. The belt may be of insulating or conductive material, one suitable construction being a belt of neoprene coated with Hypalon, and another being a belt of EPDM (ethylene propylene diamine elastomer).

In order to prevent the build up of electrostatic charge on the platen during a run of fed documents, caused by friction between the document and the platen, between the document and the belt, or between the belt and the platen, the platen is provided on its underside with a conductive layer which is electrically connected so as to remove electrostatic charge from the platen, e.g. by being grounded. The platen is of standard soda lime float glass (mirror quality). Such glass is suitable for use as the material of the platen because it has good transparency, strength, uniformity of thickness, and wear properites. Generally, it has a surface resisitivity of $10^{12}$ to $10^{15}$ ohm per square, which is sufficiently high to allow build up of electrostatic charges in the way described above, especially under certain ambient conditions. The rate of charge build up is influenced, for example, by temperature, humidity, pressure of the belt on the platen, and the presence or absence of contaminants on the platen, for example kaolin deposits from the paper.

Figure 2:
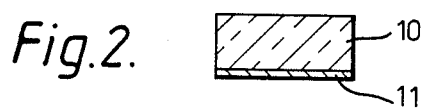
FIG. 2 is a diagrammatic cross section of a first embodiment of platen in accordance with the invention.
Figure 3:
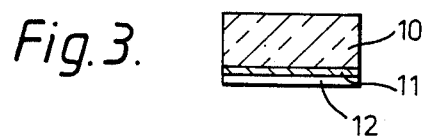
FIG. 3 is a diagrammatic cross section of a second embodiment of platen.

FIG. 2 shows a platen which comprises a glass substrate 10 with a conductive layer 11 on its lower surface. The platen upper surface, which supports the documents to be copied, consists of the normal glass, which is reasonably tolerant to wear. It has been found that a conductive coating 11 on the lower surface of the glass 10 is adequate to prevent the build up of electrostatic charges in most cases. An anti-reflection layer 12 may be provided over the conductive layer 11, as shown in FIG. 3.

The conductive layer has a surface resistivity less than that of the glass; a surface resistivity of around $10^{11}$ ohm per square will help to reduce the build up of electrostatic charge, but it is preferred that the surface resistivity of the layer be less than $10^9$ ohm per square. A typical material which is useful as the conductive layer is tin oxide, which has a surface resistivity of around $10^2$ ohm per square. Other conductive layers are possible, such as indium oxide, or layers of organic conductive material, some of which have optical transmission coefficients in excess of 90%. The material and thickness of the layer are chosen to provide the best transmission coefficient, in relation to the spectrum of the lamp, that is consistent with a sufficiently low resistivity to allow dissipation of electrostatic charge from the platen.

While the invention has been particularly described and shown with reference to preferred embodiments thereof, it is to be understood by those skilled in the art that variations and modifications may be made without departing from the scope of the invention.

What is claimed is:

1. A document reproduction apparatus which includes an object surface upon which documents to be reproduced are placed, the object surface comprising a transparent glass platen having a top surface upon which documents to be copied are positioned and a bottom surface, the bottom surface covered by a grounded, transparent, conductive layer having a surface resistivity of less that $10^9$ ohm per square, wherein said conductive layer serves to remove electrostatic charge from the top surface caused by movements of documents along said surface.

* * * * *

Disclaimer 4,805,067—*Kiri B. Amarakoon*, Letchworth, England. REMOVAL OF STATIC FROM THE PLATEN OF A COPYING APPARATUS. Patent dated Feb. 14, 1989. Disclaimer filed July 11, 1991, by the assignee, Xerox Corp.

Hereby enters this disclaimer to the remaining term of said patent.
[ *Official Gazette October 8, 1991* ]